INVENTOR.
TATSUO HORIE
BY
OSTROLENK, FABER, GERB & SOFFEN
ATTORNEYS

United States Patent Office 3,651,165
Patented Mar. 21, 1972

3,651,165
METHOD FOR RECOVERY AND PURIFICATION OF ISOBUTYLENE
Tatsuo Horie, Tokyo, Japan, assignor to Nippon Oil Company, Limited, Tokyo, Japan
Filed Aug. 28, 1969, Ser. No. 853,648
Claims priority, application Japan, Sept. 7, 1968, 43/64,171, 43/64,172
Int. Cl. C07c 11/02
U.S. Cl. 260—677 A             10 Claims

ABSTRACT OF THE DISCLOSURE

A process for recovering highly purified isobutylene comprising contacting an isobutylene-containing hydrocarbon mixture with an aqueous solution which is acidified with hydrochloric acid and containing a chloride of a metal selected from the group consisting of zinc, tin, antimony and bismuth to allow the isobutylene to be absorbed in the form of tert-butyl alcohol in the aqueous solution; removing unreacted hydrocarbons from said solution; subjecting the solution to degassing treatment; dehydrating tert-butyl alcohol to isobutylene; and decomposing tert-butyl chloride which is produced as by-product on dehydration step, to isobutylene.

---

This invention relates to a method for recovery and purification of high purity isobutylene from a mixture of hydrocarbons containing isobutylene.

More particularly, it relates to a novel method for recovery of high purity isobutylene in high yield which comprises a step for hydration wherein an aqueous hydrochloric acid solution of a chloride of metal selected from the group consisting of zinc, tin, antimony, and bismuth is used as a catalytic solution, a mixture of hydrocarbons containing isobutylene is brought into contact with the catalytic solution, and the isobutylene is selectively adsorbed in the catalytic solution as tretiary butyl alcohol, a step for removal of unreacted hydrocarbons, a step for dehydration of the tertiary butyl alcohol to isobutylene by heating said catalytic solution free of the unreacted hydrocarbons, a step for separation by distillation of tertiary butyl chloride, a by-product, which is contained in the isobutylene resulting from the dehydration, and a step for decomposition of the tertiary butyl chloride thus separated by contacting it under heated conditions with the catalytic solution which has undergone the dehydration step.

Separation of isobutylene from a mixture of hydrocarbons containing isobutylene, for example, a $C_4$ cut available as a by-product in the production of ethylene by cracking of a petroleum stock of natural gas, has heretofore been effected by the Esso process utilizing 65% sulfuric acid as a solvent or by the CFR-Badger process utilizing 50% sulfuric acid. According to the literature published, however, the purity of isobutylene obtained by a method utilizing sulfuric acid such as above is 99.0% or so. There is also a disadvantage that the use of sulfuric acid as an extracting solution inevitably cause isobutylene to polymerize and lowers the recovery of isobutylene below 90%.

This invention relates to a method for recovery and purification of isobutylene to high purity and in high yield utilizing an aqueous hydrochloric acid solution of a metal chloride as a catalytic solution, that is, a catalyst which is quite different from the sulfuric acid heretofore used.

The present inventor and his co-workers have discovered a method for recovery of high purity isobutylene in high yield wherein an aqueous acidic solution of a chloride of metal such as zinc, tin, antimony, and bismuth is brought into contact with a mixture of hydrocarbons containing isobutylene, the isobutylene is preferentially absorbed in the form of tertiary butyl alcohol, unreacted hydrocarbons are removed, and the tertiary butyl alcohol is stripped of impurities and dehydrated, as described in British Pat. No. 1,113,390 or U.S. Pat. No. 3,397,250.

Although the method just mentioned has advantages over the ones known heretofore for recovery of isobutylene, it posed a problem of the formation of tertiary butyl chloride as a by-product during dehydration of tertiary butyl alcohol to isobutylene in the presence of the catalytic solution. The boiling point of tertiary butyl chloride is 50.7° C. and differs considerably from that of isobutylene. Since these two componds do not form an azeotropic mixture, they can be separated relatively easily by distillation to yield high purity isobutylene. The amount of tertiary butyl chloride generally ranges up to a few percent of isobutylene, but it may reach 40% depending upon the conditions to be used for dehydration. Consequently, an effective method for conversion of tertiary butyl chloride to isobutylene has been in demand for the purpose of recovering as much isobutylene as possible from a hydrocarbon feedstock containing isobutylene depending upon the raw material situation.

The present inventors have solved this problem by contacting tertiary butyl chloride with the catalytic solution at a temperature from 100° C. to the boiling point of the catalytic solution and thereby decomposing effectively the tertiary butyl chloride to isobutylene. Furthermore, they have discovered that a method wherein the catalytic solution which absorbed isobutylene is introduced to a column having more than 30 plates to dehydrate tertiary butyl alcohol and decompose the by-product tertiary butyl chloride simultaneously, namely, a method wherein dehydration and decomposition are effected in the same column, is extremely effective.

The method of this invention will be described in detail.

According to this invention, a mixture of hydrocarbons containing isobutylene is first contacted with the catalytic solution which is a solution of a chloride of metal selected from the group of zinc, tin, antimony, and bismuth in aqueous hydrochloric acid, thereupon the isobutylene is preferentially adsorbed by the catalytic solution as tertiary butyl alcohol. The aforesaid catalytic solution is prepared generally by dissolving the metal chloride in hydrochloric acid or by dissolving the metal chloride and hydrogen chloride in water. In this case, a compound which substantially generates hydrochloric acid in water may be used in place of hydrogen chloride.

As the concentration of the metal chloride in the catalytic solution increases, the polymerization of isobutylene is induced and low molecular weight polymers of isobutylene are formed as by-products. On the other hand, the formation of chlorides becomes extensive as the concentration of hydrochloric acid becomes higher.

At lower concentrations of the metal chloride and hydrochloric acid, the hydration of isobutylene to tertiary butyl alcohol proceeds slowly. The composition of the metal chloride, hydrogen chloride, and water which suppresses secondary reactions such as polymerization and yet gives the reaction rate which is useful commercially is preferably as follows: metal chloride 6.0–14.0 mol percent; hydrogen chloride 4.0–11.0 mol percent; water 80.0–86–0%. Furthermore, metal ions which have higher oxidation potential than cations of the metal chloride may be allowed to co-exist in the catalytic solution to stabilize the catalytic solution. The metal chloride dissociates into ions in the catalytic solution, and ions such as $Fe^{+++}$, $Cu^{++}$, $Pd^{++}$, $Co^{+++}$, $Au^{+++}$, $Se^{++++}$, and $Ti^{++++}$ at a concentration from 10 to 100 millimols per litre of said catalytic solution, which have higher oxidation potential than said metal ions in question may be made to co-exist.

Typical examples of a mixture of hydrocarbons containing isobutylene to be used in this invention are a by-product $C_4$ fraction from thermal or catalytic cracking of petroleum or natural gas and a hydrocarbon stock containing isobutylene from dehydrogenation of lower hydrocarbons. It is preferable to remove hydrocarbons both higher and lower than $C_4$ in advance by distillation from the isobutylene-containing fraction to be used as a feedstock. The presence of butadiene and acetylenes does not constitute a serious obstacle to the method of this invention, but it is preferable to be removed by extraction, selective hydrogenation, and the like.

The reaction which takes place during the stage now under consideration is hydration wherein isobutylene is preferentially converted to tertiary butyl alcohol. The hydrocarbon feedstock may be brought into contact with the catalytic solution either in gas phase or in liquid phase. However, the latter is preferable from a standpoint of yield and commercial operation. Any method of contact which effects sufficient contact may be employed, and agitation by an ordinary agitator or circulating agitation is recommended. The reaction is carried out at a temperature from 0° to 60° C., preferably from 20° to 45° C., and at a pressure from 0 to 10 atmospheres gauge. The contact time varies depending upon the recovery of isobutylene, the concentration of isobutylene in the hydrocarbon feedstock, the composition of the catalytic solution, the volume ratio of the hydrocarbon feedstock to the catalytic solution, and the like, and it ranges from several minutes to several hours.

Upon completion of the reaction, unreacted hydrocarbons are removed from the reaction mixture. In case the hydrocarbon feedstock is charged in liquid state, the reaction mixture is allowed to stand still and the unreacted hydrocarbons which form the upper layer are separated from the catalytic solution containing tertiary butyl alcohol. In order to carry out this separation more precisely, the following stripping operation is desirable. The stripping is a step wherein the unreacted hydrocarbons such as butene-1, butene-2, isobutane, and n-butane which are physically dissolved in the catalytic solution containing the abovementioned tertiary butyl alcohol are driven out. If the catalytic solution containing such physically dissolved unreacted hydrocarbons is transferred to the succeeding steps, these hydrocarbons will be contained in the product isobutylene, which is no doubt undesirable. In accordance with this invention, the stripping operation to drive off the physically dissolved unreacted hydrocarbons may be carried out by placing the catalytic solution containing said tertiary butyl alcohol under vacuum, by vigorously agitating the solution or by blowing an inert gas into the solution. However, the preferable method for stripping is to degas by heating the catalytic solution or to heat the catalytic solution to 60-75° C. and flash it in a flashing drum.

The catalytic solution containing tertiary butyl alcohol and being free of the unreacted hydrocarbons after the foregoing stripping step is sent to the dehydration step. The dehydration is effected by heating the catalytic solution containing the tertiary butyl alcohol. The method for recovery and purification of isobutylene in accordance with this invention is characterized by the fact that the catalytic solution containing tertiary butyl alcohol is simply heated to dehydrate the tertiary butyl alcohol to isobutylene. The catalytic solution of this invention catalyzes effectively not only the preferential hydration of isobutylene to tertiary butyl alcohol but also the dehydration of tertiary butyl alcohol to isobutylene under heated conditions. Another product of the dehydration reaction, i.e. water, is absorbed in the catalytic solution.

It is necessary to maintain the heating temperature from 80° C. to the boiling point of the catalytic solution. Below 80° C., the dehydration of tertiary butyl alcohol does not take place satisfactorily. On the other hand, it is meaningless to heat the catalytic solution above its boiling point. The dehydration is usually carried out in a column or a heated agitating tank, but the former is preferable because the heating is done continuously and isobutylene resulting from the dehydration is obtained effectively from the top of the column without undergoing polymerization. However, tertiary butyl chloride is formed together with isobutylene during this step according to this invention. Tertiary butyl chloride and isobutylene boil so widely apart as to enable the separation of them simply by distillation. Since the products obtained after the dehydration step contain essentially only isobutylene and tertiary butyl chloride, it is possible to separate isobutylene and tertiary butyl chloride, both of high purity, by distillation. Although tertiary butyl chloride itself finds various applications in the chemical industry, it may have to be converted to isobutylene by some means in case the supply-demand relation or the raw material situation demands the maximum recovery of isobutylene. The method of this invention has solved this problem and it has advantages that the catalytic solution can be used continuously in recycle and isobutylene can be recovered in high yield.

The isobutylene containing tertiary butyl chloride from the dehydration step is subjected to distillation, and the product isobutylene of high purity is taken from the top of the distillation column. The tertiary butyl chloride is withdrawn from the bottom and is then contacted with the dehydrated catalytic solution at a temperature from 100° C. to the boiling point of the catalytic solution, whereby the majority of the tertiary butyl chloride is decomposed to isobutylene. The decomposition does not occur below 100° C. The catalytic solution of this invention is also capable of effectively catalyzing the decomposition of tertiary butyl chloride to isobutylene. Hydrogen chloride, another product, of this decomposition reaction, is absorbed in the catalytic solution. The operation for this decomposition is usually carried out by contacting the catalytic solution with tertiary butyl chloride intimately in a column or a heated agitating tank. The use of a column is preferable, and isobutylene is obtained from the top of the column in such a case. Although the isobutylene thus obtained may pass as the product, it still contains some tertiary butyl chloride and can be further purified to a higher purity product by distillation. The distilling operation here is substantially the same as that of the distilling operation after the dehydration mentioned above, and so the isobutylene coming from the decomposition step may be circulated to the distillation step which follows the dehydration step.

On the other hand, the catalytic solution obtained from the decomposition step is returned to the hydration step. The catalytic solution thus goes through hydration, stripping, dehydration, and decomposition steps and returns to the hydration step completing a cycle. An advantage of this invention is that the catalytic solution having undergone the decomposition step possesses substantially the same composition as that used in the hydration step, therefore a wide range adjustment of the composition of the catalytic solution is not necessary before recycling it. This is made possible because, in the method of this invention, tertiary butyl chloride is virtually not discharged out of the system, water and hydrogen chloride are neither added nor discharged in each step, and as an overall result, the composition of the catalytic solution remains substantially unchanged.

It is possible to carry out the abovementioned dehydration of tertiary butyl alcohol and decomposition of tertiary butyl chloride in a single step. The catalytic solution coming from the stripping step containing tertiary butyl alcohol and free of unreacted hydrocarbons is led into a column equipped with more than 30 plates (hereinafter called the dehydration-decomposition column).

This dehydration-decomposition column is kept below 70° C. at the top and from 100° C. to the boiling point of the catalytic solution at the bottom. The stripped catalytic solution is heated in the dehydration-decomposition column whereby tertiary butyl alcohol is dehydrated to isobutylene. Since the isobutylene thus formed contains some tertiary butyl chloride, it is subjected to distillation wherein high purity isobutylene is obtained from the top of the distillation column as the product. Tertiary butyl chloride from the bottom is charged into the dehydration-decomposition column at a zone having a temperature of above 80° C. The tertiary butyl chloride thus charged comes into contact with the catalytic solution which is heated to above 80° C. and decomposes to give isobutylene and hydrogen chloride. The isobutylene rises through the column and goes out from the top while the hydrogen chloride is absorbed in the catalytic solution.

In this manner, both the dehydration of tertiary butyl alcohol and the decomposition of tertiary butyl chloride take place in the dehydration-decomposition column. The introduction of the tertiary butyl chloride to the dehydration-decomposition column at a point in a temperature zone of above 80° C. is required to make the decomposition reaction proceed effectively. Moreover, it is necessary to maintain the temperatures of the dehydration-decomposition column below 70° C., preferably from 10° to 60° C., at the top and from 100° C. to the boiling point of the catalytic solution at the bottom. When the temperature at the top of the column exceeds 70° C., more tertiary butyl chloride distils and the tertiary butyl alcohol present in the catalytic solution begins to distil. On the other hand, when the temperature at the bottom of the column falls below 100° C., the dehydration of tertiary butyl alcohol and decomposition of tertiary butyl chloride do not occur effectively. The dehydration-decomposition column used here has more than 30 plates, preferably from 40 to 100 plates. When the number of plates is less than 30, the dehydration and decomposition reactions do not occur satisfactorily. The greater number of plates do not hinder the operation at all, but 100 plates would be sufficient enough for commercial operation. In the above step, a packed column which corresponds to a plate column having more than 30 plates in ordinary distillation can also be used.

The catalytic solution withdrawn from the bottom of the dehydration-decomposition column is circulated back to the hydration step. Thus, the catalytic solution passes through the hydration and dehydration-decomposition steps and returns to the initial hydration step. As mentioned above, the catalytic solution emerging from the dehydration-decomposition step has substantially the same composition as the solution initially used in the hydration step and there is no need for wide range adjusting the catalytic solution before circulating it back.

This invention will be explained in more detail with reference to the accompanying drawings.

Figure 1:
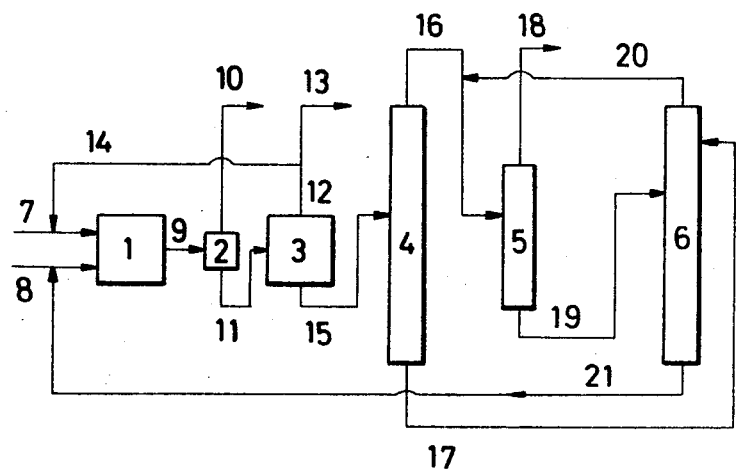
FIG. 1 is a flow sheet of the first system for carrying out the method of this invention.

With reference to FIG. 1, 1 is a hydration reactor. This reactor may be equipped with a suitable jacket to maintain the inner temperature from 0° to 60° C. A hydrocarbon feed containing isobutylene is charged into the reactor 1 via line 7 and the catalytic solution via line 21, thereupon they are brought into intimate contact. The catalytic solution required for start-up is supplied or slight losses of the catalytic solution incurred during circulation are replenished via line 8. The reaction mixture from the hydration step is sent to a settling tank 2 via line 9. Unreacted hydrocarbons which separate as an upper layer in the settling tank 2 is exhausted via line 10, and the lower layer in the tank 2 which contains tertiary butyl alcohol is led via line 11 to a flashing drum 3 where it is stripped. In case the stripping is effected by flashing, line 11 is heated to 60–75° C. and the catalytic solution is supplied into the drum 3 which serves as a flashing drum. The stripped gases may be led out of the system via lines 12 and 13; however, they contain isobutylene which results from partial dehydration of tertiary butyl alcohol in the catalytic solution and are preferably returned to the hydration step via line 14.

The stripped catalytic solution containing tertiary butyl alcohol is introduced via line 15 to a dehydration column 4 which has from 20 to 60 plates. The bottom of the dehydration column 4 is heated by a reboiler to a temperature near the boiling point of the catalytic solution, and the top of the column is maintained at about 20° to 70° C. The tertiary butyl alcohol in the catalytic solution is dehydrated in the dehydration column 4 and isobutylene is taken out from line 16. The isobutylene thus produced still contains from a few percent to 40% of the by-product tertiary butyl chloride. The isobutylene is sent to a distillation column 5 via line 16, and the product isobutylene of high purity is obtained from the top of the column 5 via line 18. The tertiary butyl chloride is obtained from the bottom of the column 5, and it is introduced via line 19 to a decomposition column 6 having from 20 to 60 plates. The catalytic solution having undergone dehydration in the dehydration column 4 is also introduced to the upper section of the decomposition column 6 via line 17. The bottom of the decomposition column is heated by a reboiler to a temperature near the boiling point of the catalytic solution. In the decomposition column, the tertiary butyl chloride is decomposed to isobutylene and hydrogen chloride. The hydrogen chloride is absorbed in the catalytic solution and the isobutylene is taken out from the top of the column via line 20. The isobutylene from line 20 contains some tertiary butyl chloride and is preferably returned to the distillation column 5 for separation of the tertiary butyl chloride as shown in the figure. The catalytic solution withdrawn from the bottom of the decomposition column is returned to the hydration reactor 1 via line 21. It is possible to make some corrections in the composition of the catalytic solution in line 21.

Figure 2:
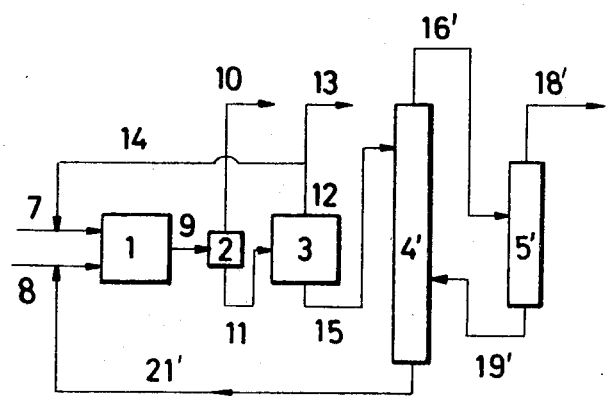
FIG. 2 is a flow sheet of the second system, an improved modification of the first, for carrying out the method of this invention.

FIG. 2 represents a flow sheet for an improved modification of the method described above. The same procedure as in the first method is followed in the first stages. The inside of the hydration reactor 1 is maintained at a temperature from 0° to 60° C., and the hydrocarbon feed containing isobutylene is charged to the hydration reactor 1 via line 7 and the catalytic solution via line 21' to be contacted there intimately. The catalytic solution required for start-up is supplied or slight losses of the catalytic solution incurred during circulation are replenished via line 8. The reaction mixture from the hydration step is sent to a settling tank 2 via line 9. Unreacted hydrocarbons which separate as an upper layer in the settling tank 2 are discharged out of the system via line 10. The catalytic solution containing teriary butyl alcohol which separates as a bottom layer in the settling tank 2 is led via line 11 to a flashing drum 3 where it is stripped.

In case the stripping is effected by flashing, line 11 is heated to 60–75° C. and the catalytic solution is fed into the drum 3 which serves as a flashing drum. The stripped gases may be led out of the system via lines 12 and 13; however, they contain isobutylene which results from partial dehydration of tertiary butyl alcohol in the catalytic solution and are preferably returned to the hydration step via line 14.

The stripped catalytic solution containing tertiary butyl alcohol is introduced to a dehydration-decomposition column 4' via line 15. Now, the catalytic solution may be introduced to the column 4' at any place, but it is preferably introduced at the middle or upper section of the column in order to dehydrate the tertiary butyl alcohol effectively and to stabilize the operation of the column. The column 4' is maintained below 70° C. at the top and from 100° C. to the boiling point of the catalytic solution (about 105–140° C.) at the bottom. Isobutylene containing tertiary butyl chloride distils from the top of the column 4'. This distillate is introduced via line 16 to a distillation column 5' which is an ordinary distillation column. High purity product isobutylene is taken out from the top of the column 5' via line 18'. The tertiary butyl chloride coming from the bottom of the distillation column 5' is introduced to the column 4' via line 19' at a section having a temperature of above 80° C. The tertiary butyl chloride thus introduced undergoes decomposition in the column 4'. The catalytic solution having gone through the dehydration-decomposition step is withdrawn from the bottom of the column 4' and returned to the hydration reactor 1 at the start via line 21. It is possible to make some corrections in the composition of the catalytic solution in line 21'.

This invention will be illustrated in further detail with reference to example. Only those examples in which zinc chloride, $ZnCl_2$, was used as the metal chloride component of the catalyst are given below. In practice, however, a chloride of tin, antimony or bismuth, when used in place of zinc chloride, yielded essentially the same results under the same reaction conditions.

EXAMPLE 1

The method of this invention was carried out according to the flow sheet shown in FIG. 1. A mixture of hydrocarbons which had been prepared by extracting butadiene from a $C_4$ fraction obtained as a by-product in a thermal cracking of naphtha and had the composition shown in Table 1 was used as a feedstock. The catalytic solution was an aqueous solution containing 3.5 mols of zinc chloride, 3.5 mols of hydrogen chloride, and 40 millimols of $Fe^{+++}$ per litre. The hydrocarbon feedstock was introduced to the reactor 1 via line 7 at a rate of 250 litres per hour and the catalytic solution was returned to the hydration reactor 1 via line 21 at a rate of 220 litres per hour. The temperature of hydration reaction was maintained at 37° C. The reaction mixture was introduced to the settling tank 2, and unreacted hydrocarbon was separated, and the catalytic solution was introduced to the flashing drum 3 via line 11.

TABLE 1

Hydrocarbon feedstock (percent by weight)

| | |
|---|---|
| Propane, propylene | 0.7 |
| iso-Butane | 2.3 |
| n-Butane | 10.5 |
| trans-Butene-2 | 8.7 |
| cis-Butene-2 | 7.4 |
| Isobutylene | 47.7 |
| Butene-1 | 21.9 |
| 1,3-Butadiene | 0.8 |
| $C_5$ | Trace |
| $C_6$ and higher | Trace |

The stripping operation was carried out at 64° C. and the stripped gases were circulated through line 14 at a rate of 1.2 m.³/hr. The catalytic solution containing tertiary butyl alcohol was charged into the dehydration column via line 15. The dehydration column had 25 perforated plates and it was maintained at 58° C. at the top and at the boiling point of the catalytic solution at the bottom. The fraction coming from the top of the dehydration column was charged into the distillation column 5. Tertiary butyl chloride was obtained at a rate of 20 litres per hour from the bottom of the distillation column 5 and it was charged to the decomposition column 6 via line 19. The distillate from the top of the decomposition column was circulated to the distillation column 5 via line 20. The decomposition column was maintained at a temperature of 60° C. at the top and at the boiling point of the catalytic solution at the bottom. Isobutylene of 99.92% purity was obtained from the top of the distillation column 5 at a rate of 112 litres per hour and the recovery of the isobutylene was 94%. The catalytic solution did not suffer any reduction in its activity after recycle.

EXAMPLE 2

The method of this invention was carried out according to the flow sheet shown in FIG. 2. A mixture of hydrocarbons which had been prepared by extracting butadiene from a $C_4$ fraction obtained as a by-product in a thermal cracking of naphtha and had the composition shown in Table 1 was used as a feedstock. The catalytic solution was an aqueous solution containing 4.5 mols of zinc chloride, 3.5 mols of hydrogen chloride, and 10 millimols of $Fe^{+++}$ per litre. The hydrocarbon feedstock was introduced to reactor 1 via line 6 at a rate of 212 litres per hour and the catalytic solution in circulation was introduced to the reactor 1 via line 21' at a rate of 181 litres per hour. The temperature of hydration reaction was maintained at 40° C. The reaction mixture was introduced to the settling tank 2 to separate unreacted hydrocarbons and the catalytic solution was introduced to the stripping tank 3 via line 11.

The stripping was carried out at 71° C. and the stripped gases were circulated through line 14 at a rate of 27 m.³/hr. The catalytic solution containing tertiary butyl alcohol was introduced to the upper section of the dehydration-decomposition column 4' having 60 perforated plates. The column 4' was maintained at a temperature of 60° C. at the top and at the boiling point of the catalytic solution at the bottom. Isobutylene distilling from the top of the column 4' and containing tertiary butyl chloride was introduced to the distillation column 5' via line 16' to effect separation of isobutylene and tertiary butyl chloride. Isobutylene of 99.94% purity was taken out from line 18' at a rate of 94.5 litres per hour and the recovery of the isobutylene was 93.5%. The tertiary butyl chloride which was withdrawn from the bottom of the column 5' was introduced to column 4' at a section having a temperature of 108° C. via line 19'.

The catalytic solution withdrawn from the bottom of the column 4' was circulated for repeated use, but no accumulation of harmful products or deposits was observed and the catalytic activity was maintained.

The abovementioned results prove that this invention provides an excellent method for recovery and purification of isobutylene.

What is claimed is:

1. A method for recovery and purification of high purity isobutylene in high yield from a mixture of hydrocarbons containing isobutylene which comprises contacting a mixture of hydrocarbons containing isobutylene with a catalytic solution, said catalytic solution being an aqueous solution of hydrochloric acid containing at least one chloride of metal selected from the group consisting of zinc, tin, antimony, and bismuth; absorbing isobutylene selectively by said catalytic solution in the form of tertiary butyl alcohol to effect hydration at a temperature from 0° to 60° C.; removing unreacted hydrocarbons; heating the catalytic solution containing the tertiary butyl alcohol at a temperature from 80° C. to the boiling point of the catalytic solution to effect dehydration of said tertiary butyl alcohol into isobutylene; distilling the resultant isobutylene which contains tertiary butyl chloride as by-product to obtain high purity isobutylene from the top of the distillation column and recovering tertiary butyl chloride from the bottom of the distillation column; contacting said tertiary butyl chloride with the catalytic solution having undergone the dehydration at a temperature from 100° C. to the boiling point of the catalytic solution to decompose most of said tertiary butyl chloride; distilling isobutylene resulting from said decomposition; and circulating the catalytic solution from the decomposition step to the initial hydration step.

2. A process according to claim 1 wherein said aqueous solution consists essentially of 6.0–14.0 mol percent of metal chloride, 4.0–11.0 mol percent of hydrogen chloride and 80.0–86.0 mol percent water.

3. A process according to claim 1 wherein said aqueous solution contains at least one metallic ion having higher oxidation potential than zinc, tin, antimony or bismuth at a concentration from 10 to 100 millimols per liter of said aqueous solution.

4. A process according to claim 3 wherein said metallic ion is a member selected from the group consisting of $Fe^{+++}$, $Cu^{++}$, $Pd^{++}$, $Co^{+++}$, $Au^{+++}$, $Se^{++++}$ and $Ti^{++++}$.

5. A process according to claim 1 wherein said mixture of hydrocarbons containing isobutylene is a $C_4$ fraction from the thermal or catalytic cracking of hydrocarbon.

6. A method for recovery and purification of high purity isobutylene in high yield from a mixture of hydrocarbons containing isobutylene which comprises contacting a mixture of hydrocarbons containing isobutylene with a catalytic solution, said catalytic solution being an aqueous solution of hydrochloric acid containing at least one chloride of metal selected from the group consisting of zinc, tin, antimony and bismuth; absorbing the isobutylene selectively by said catalytic solution in the form of tertiary butyl alcohol to effect hydration at a temperature from 0° to 60° C.; removing unreacted hydrocarbons; introducing the catalytic solution containing the tertiary butyl alcohol to a column equipped with more than 30 plates, said column being maintained at a temperature from 100° C. to the boiling point of the catalytic solution at the bottom and at a temperature below 70° C. at the top; circulating the catalytic solution withdrawn from the bottom of said column to the hydration step; subjecting isobutylene containing tertiary butyl chloride obtained from the top of said column to distillation to separate the product isobutylene and tertiary butyl chloride; and introducing the tertiary butyl chloride to said column equipped with more than 30 plates at a point having a temperature of above 80° C.

7. A process according to claim 6 wherein said aqueous solution consists essentially of 6.0–14.0 mol percent of metal chloride, 4.0–11.0 mol percent of hydrogen chloride and 80.0–86.0 mol percent of water.

8. A process according to claim 6 wherein said aqueous solution contains at least one metallic ion having higher oxidation potential than zinc, tin, antimony or bismuth at a concentration from 10 to 100 millimols per liter of said aqueous solution.

9. A process according to claim 8 wherein said metallic ion is a member selected from the group consisting of $Fee^{+++}$, $Cu^{++}$, $Pd^{++}$, $Co^{+++}$, $Au^{+++}$, $Se^{++++}$ and $Ti^{++++}$.

10. A process according to claim 6 wherein said mixture of hydrocarbons containing isobutylene is a $C_4$ fraction from the thermal or catalytic cracking of hydrocarbons.

References Cited

UNITED STATES PATENTS

| | | | |
|---|---|---|---|
| 3,397,250 | 8/1968 | Nambu | 260—677 |
| 2,303,362 | 12/1942 | Jessup et al. | 260—683 |
| 2,491,786 | 12/1949 | Weinrich | 260—677 |
| 3,280,208 | 10/1966 | Turnquest et al. | 260—677 |
| 2,107,515 | 3/1938 | Bent | 260—156 |
| 2,156,070 | 4/1939 | Stern | 260—663 |

DELBERT E. GANTZ, Primary Examiner

J. M. NELSON, Assistant Examiner

U.S. Cl. X.R.

260—654